(12) United States Patent  
Tsuchikiri et al.

(10) Patent No.: US 8,554,403 B2  
(45) Date of Patent: Oct. 8, 2013

(54) VEHICLE FAILURE DIAGNOSTIC DEVICE

(75) Inventors: Hideyuki Tsuchikiri, Tokyo (JP); Yasushi Sato, Tokyo (JP); Jiro Aihara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 13/133,484

(22) PCT Filed: Dec. 2, 2009

(86) PCT No.: PCT/JP2009/006571  
§ 371 (c)(1),  
(2), (4) Date: Sep. 6, 2011

(87) PCT Pub. No.: WO2010/067547  
PCT Pub. Date: Jun. 17, 2010

(65) Prior Publication Data  
US 2011/0313616 A1    Dec. 22, 2011

(30) Foreign Application Priority Data

Dec. 10, 2008    (JP) ................................. 2008-314436

(51) Int. Cl.  
*G01M 17/00*    (2006.01)

(52) U.S. Cl.  
USPC ........................................ 701/29.1; 701/33.1

(58) Field of Classification Search  
USPC .................... 701/29.7–29.9, 33.6–36.8, 33.2, 701/33.4, 31.4, 29.1, 29.2; 340/438, 500; 702/182–185  
See application file for complete search history.

(56) References Cited

U.S. PATENT DOCUMENTS 5,491,631 A * 2/1996 Shirane et al. ............... 701/29.6

FOREIGN PATENT DOCUMENTS

| JP | 62-261938 | 11/1987 |
| JP | 06-095881 | 4/1994 |
| JP | 09-072828 | 3/1997 |
| JP | 09-311094 | 12/1997 |
| JP | 2003-015877 | 1/2003 |

OTHER PUBLICATIONS

International Preliminary Report on Patentability application No. PCT/JP2009/006571 dated Jul. 5, 2011.  
International Search Report dated Mar. 9, 2010 corresponding to International Patent Application No. PCT/JP2009/006571.

* cited by examiner

*Primary Examiner* — Yonel Beaulieu  
(74) *Attorney, Agent, or Firm* — Squire Sanders (US) LLP (57) ABSTRACT

A vehicle failure is diagnosed based on data recorded in an electronic control unit (ECU) of a vehicle. Driving data pertaining to multiple parameters which are stored in the electronic control unit of the vehicle for when a vehicle failure occurs are compared with reference values representing data during normal driving in order to diagnose a failure. The device utilizes an approximate search between inspection data, that is, driving data which are stored in the electronic control unit of the vehicle to be diagnosed for failure, and reference value groups categorized by driving environment, wherein a normal value range is set for each of the aforementioned parameters categorized by driving environment, and selects the reference value group categorized by driving environment which approximates the inspection data. Furthermore, the device compares the inspection data with the normal value ranges of each parameter of the selected reference value group categorized by driving environment so as to identify parameters which deviate significantly from the normal value ranges and find the cause of the failure based on the parameters identified.

7 Claims, 7 Drawing Sheets

| Time (Sec) | Rn (rpm) | | | | | | Vn (km/h) | | | | | | Tn (°C) | | | | | |
|---|---|---|---|---|---|---|---|---|---|---|---|---|---|---|---|---|---|---|
| | $Rn_{av}$ | $Rn_{mx}$ | $Rn_{mn}$ | $Rn_{in}$ | | | $Vn_{av}$ | $Vn_{mx}$ | $Vn_{mn}$ | $Vn_{in}$ | | | $Tn_{av}$ | $Tn_{mx}$ | $Tn_{mn}$ | $Tn_{in}$ | | |
| -14.8~ -12.0 | $Rn_{av-1}$ | $Rn_{mx-1}$ | $Rn_{mn-1}$ | $Rn_{in-1}$ | | | $Vn_{av-1}$ | $Vn_{mx-1}$ | $Vn_{mn-1}$ | $Vn_{in-1}$ | | | $Tn_{av-1}$ | $Tn_{mx-1}$ | $Tn_{mn-1}$ | $Tn_{in-1}$ | | |
| -11.8~ -9.0 | $Rn_{av-2}$ | $Rn_{mx-2}$ | $Rn_{mn-2}$ | $Rn_{in-2}$ | | | $Vn_{av-2}$ | $Vn_{mx-2}$ | $Vn_{mn-2}$ | $Vn_{in-2}$ | | | $Tn_{av-2}$ | $Tn_{mx-2}$ | $Tn_{mn-2}$ | $Tn_{in-2}$ | | |
| -8.8~ -6.0 | $Rn_{av-3}$ | $Rn_{mx-3}$ | $Rn_{mn-3}$ | $Rn_{in-3}$ | | | $Vn_{av-3}$ | $Vn_{mx-3}$ | $Vn_{mn-3}$ | $Vn_{in-3}$ | | | $Tn_{av-3}$ | $Tn_{mx-3}$ | $Tn_{mn-3}$ | $Tn_{in-3}$ | | |
| -5.8~ -3.0 | $Rn_{av-4}$ | $Rn_{mx-4}$ | $Rn_{mn-4}$ | $Rn_{in-4}$ | | | $Vn_{av-4}$ | $Vn_{mx-4}$ | $Vn_{mn-4}$ | $Vn_{in-4}$ | | | $Tn_{av-4}$ | $Tn_{mx-4}$ | $Tn_{mn-4}$ | $Tn_{in-4}$ | | |
| -2.8~ 0 | $Rn_{av-5}$ | $Rn_{mx-5}$ | $Rn_{mn-5}$ | $Rn_{in-5}$ | | | $Vn_{av-5}$ | $Vn_{mx-5}$ | $Vn_{mn-5}$ | $Vn_{in-5}$ | | | $Tn_{av-5}$ | $Tn_{mx-5}$ | $Tn_{mn-5}$ | $Tn_{in-5}$ | | |

| Time (Sec) | Rn' (rpm) | | | Vn' (km/h) | | | Tn' (°C) | | |
|---|---|---|---|---|---|---|---|---|---|
| | Rn'$_{av}$ | Rn'$_{mx}$ | Rn'$_{mn}$ | Rn'$_{in}$ | Vn'$_{av}$ | Vn'$_{mx}$ | Vn'$_{mn}$ | Vn'$_{in}$ | Tn'$_{av}$ | Tn'$_{mx}$ | Tn'$_{mn}$ | Tn'$_{in}$ |
| −14.8~ −12.0 | Rn'$_{av-1}$ | Rn'$_{mx-1}$ | Rn'$_{mn-1}$ | Rn'$_{in-1}$ | Vn'$_{av-1}$ | Vn'$_{mx-1}$ | Vn'$_{mn-1}$ | Vn'$_{in-1}$ | Tn'$_{av-1}$ | Tn'$_{mx-1}$ | Tn'$_{mn-1}$ | Tn'$_{in-1}$ |
| −11.8~ −9.0 | Rn'$_{av-2}$ | Rn'$_{mx-2}$ | Rn'$_{mn-2}$ | Rn'$_{in-2}$ | Vn'$_{av-2}$ | Vn'$_{mx-2}$ | Vn'$_{mn-2}$ | Vn'$_{in-2}$ | Tn'$_{av-2}$ | Tn'$_{mx-2}$ | Tn'$_{mn-2}$ | Tn'$_{in-2}$ |
| −8.8~ −6.0 | Rn'$_{av-3}$ | Rn'$_{mx-3}$ | Rn'$_{mn-3}$ | Rn'$_{in-3}$ | Vn'$_{av-3}$ | Vn'$_{mx-3}$ | Vn'$_{mn-3}$ | Vn'$_{in-3}$ | Tn'$_{av-3}$ | Tn'$_{mx-3}$ | Tn'$_{mn-3}$ | Tn'$_{in-3}$ |
| −5.8~ −3.0 | Rn'$_{av-4}$ | Rn'$_{mx-4}$ | Rn'$_{mn-4}$ | Rn'$_{in-4}$ | Vn'$_{av-4}$ | Vn'$_{mx-4}$ | Vn'$_{mn-4}$ | Vn'$_{in-4}$ | Tn'$_{av-4}$ | Tn'$_{mx-4}$ | Tn'$_{mn-4}$ | Tn'$_{in-4}$ |
| −2.8~ 0 | Rn'$_{av-5}$ | Rn'$_{mx-5}$ | Rn'$_{mn-5}$ | Rn'$_{in-5}$ | Vn'$_{av-5}$ | Vn'$_{mx-5}$ | Vn'$_{mn-5}$ | Vn'$_{in-5}$ | Tn'$_{av-5}$ | Tn'$_{mx-5}$ | Tn'$_{mn-5}$ | Tn'$_{in-5}$ |

FIG. 7

VEHICLE FAILURE DIAGNOSTIC DEVICE

TECHNICAL FIELD

The present invention relates to a device for diagnosing a failure based on data stored in a storage unit of an electronic control unit (ECU) in each vehicle during driving.

BACKGROUND ART

There is known a diagnostic device as a tool for diagnosing a failure of a vehicle such as automobile. In recent years, there is considered that a so-called expert system for registering information on failures occurring in the past in database and estimating a cause of a newly occurring failure is used as the diagnostic device. The expert system has a rule base estimation system in which human experiences and knowledge are registered in database for search and a model base estimation system in which behaviors of the system during normal time or during failure are learned for searching a failure cause by simulation.

In the former system, a mechanism is simple and a relatively high reliability can be expected but the knowledge is difficult to rule and a rule needs to be added or modified each time the target system is changed.

On the other hand, in the latter system, even if an operating staff does not have sufficient experience or knowledge, a failure site can be estimated and a certain degree of versatility can be expected in terms of the change in the target system. Particularly, a method for comparing data during normal time with data during failure under the same driving environmental condition is one of the most effective means for finding a cause of a failure.

However, since various environmental conditions or travel patterns are present for the driving of a vehicle and a range of normal values, which a large number of respective driving parameters can take depending on a respective situation, can be independently changed, the data during normal time needs to be collected under various driving situations in order to obtain normal value data for comparing items of data under similar conditions and to make an accurate decision.

There is described in Japanese Patent Application Laid-Open No. 62-261938 (Patent Literature 1) a diagnostic device comprising knowledge data storing means for storing accurate information on a relationship between a failure symptom and a corresponding cause and rare case storing means for storing inaccurate information.

Japanese Patent Application Laid-Open No. 6-95881 Publication (Patent Literature 2) describes therein analyzing design data or past failure data and inputting it as EMEA in a positive estimation system in relational database, creating a modified EMEA and then an event sequence diagram, creating a failure retrieval three for reference to a rule base, and digitizing an expert know-how to create a rule base.

Since an extremely large number of driving parameters are present and normal value ranges of the respective driving parameters are present corresponding to driving environments (which may be referred to as driving conditions) in a complicated electronic control system used in a vehicle, it is so difficult to extract reference ECU data (in which the respective driving parameters are in normal value ranges) in a driving environment near ECU data (inspection data) to be diagnosed from among a large number of items of normal value data. Since many devices cooperate for control, if one failure occurs, multiple driving parameters are influenced and are likely to be deviated from the normal values. Thus, the associations between the driving parameters out of the normal values and the failure causes need to be considered.

As one example for the associations, there is described in Japanese Patent Application Laid-Open No. 2003-15877 (Patent Literature 3) that a qualitative processing is performed on process data obtained from events to be monitored to calculate similarities between the obtained qualitative data and the qualitative data for all the cases and case data is extracted in descending order of similarity for the data having a certain similarity from among all the cases.

The more the number of parameters on driving is, the more the number of driving parameters out of the normal value data ranges is when a failure occurs, and it is important to accurately judge the driving parameters in direct relation with the failure cause and to make a failure diagnosis. In other words, it is important to accurately select a parameter to be paid attention from among the driving parameters out of the normal value ranges.

DOCUMENTS OF RELATED ART

Patent Literature

Patent Literature 1: Japanese Patent Application Laid-Open No. 62-261938

Patent Literature 2: Japanese Patent Application Laid-Open No. 6-95881

Patent Literature 3: Japanese Patent Application Laid-Open No. 2003-15877

SUMMARY OF INVENTION

Problem to be Solved by the Invention

Therefore, it is an object of the present invention to provide a diagnostic device capable of identifying a parameter to be paid attention from among driving parameters out of normal value ranges, the diagnostic device making a vehicle failure diagnosis based on data recorded in an electronic control unit (ECU) in a vehicle.

Means for Solving the Problem

In order to achieve the above object, a failure diagnostic unit for making a failure diagnosis by comparing driving data relating to a plurality of parameters stored in an electronic control unit of a vehicle when a failure occurs in the vehicle with reference values as reference driving data during normal time, includes means for selecting reference value groups categorized by driving environment, which are entirely approximated to inspection data, by approximate search between the inspection data which is the driving data stored in the electronic control unit of a vehicle to be subjected to failure diagnosis and the reference value groups categorized by driving environment whose normal value ranges are set for the parameters categorized by driving environment.

The device further comprises means for comparing the inspection data with the normal value ranges of the parameters in the selected reference value group categorized by driving environment and identifying parameters which deviate significantly from the normal value ranges, and finds the cause of the failure based on the identified parameters.

In one embodiment of the invention, the driving data for the plurality of parameters obtained from many vehicles are clustered by a clustering method to set normal value ranges of the driving data for the plurality of parameters in the thus-formed respective clusters so that the reference value groups categorized by driving environment are formed.

In addition, in one embodiment of the invention, the inspection data is numerical value vectors having predetermined time intervals of the plurality of parameters and the means for selecting the approximate reference value groups categorized by driving environment calculates a distance between the numerical value vector and a core vector as the center of gravity of a cluster of the reference value group to select a reference value group having the shortest distance per numerical value vector.

In another embodiment of the invention, the clusters include primary clusters for which partial parameters among the plurality of parameters are clustered and secondary clusters for which the numerical value vectors belonging to the primary clusters are clustered for more parameters than the partial parameters, and the means for selecting the approximate reference value groups categorized by driving environment selects the primary clusters for the numerical value vectors of the inspection data and then selects a cluster having the shortest distance from the secondary clusters belonging to the primary clusters.

In one embodiment of the invention, a deviation from the normal value range is judged by comparing the normal value ranges of the clusters selected corresponding to the numerical value vectors of the inspection data with the numerical value vectors and using at least a ratio of the number of numerical value vectors out of the normal value ranges relative to the number of numerical value vectors of the inspection data.

In addition, in one embodiment of the invention, a deviation from the normal value range is judged by comparing the normal value ranges of the clusters selected corresponding to the numerical value vectors of the inspection data with the numerical value vectors and using, for a parameter, at least a difference between the numerical values of the numerical value vectors of the inspection data out of the normal value ranges and the normal value ranges.

In one embodiment of the invention, a deviation from the normal value range is judged by comparing the normal value ranges of the clusters selected corresponding to the numerical value vectors of the inspection data with the numerical value vectors and using at least a ratio of the number of numerical value vectors continuously out of the normal value ranges relative to the total number of numerical value vectors.

BEST MODES FOR CARRYING OUT THE INVENTION

Figure 1:
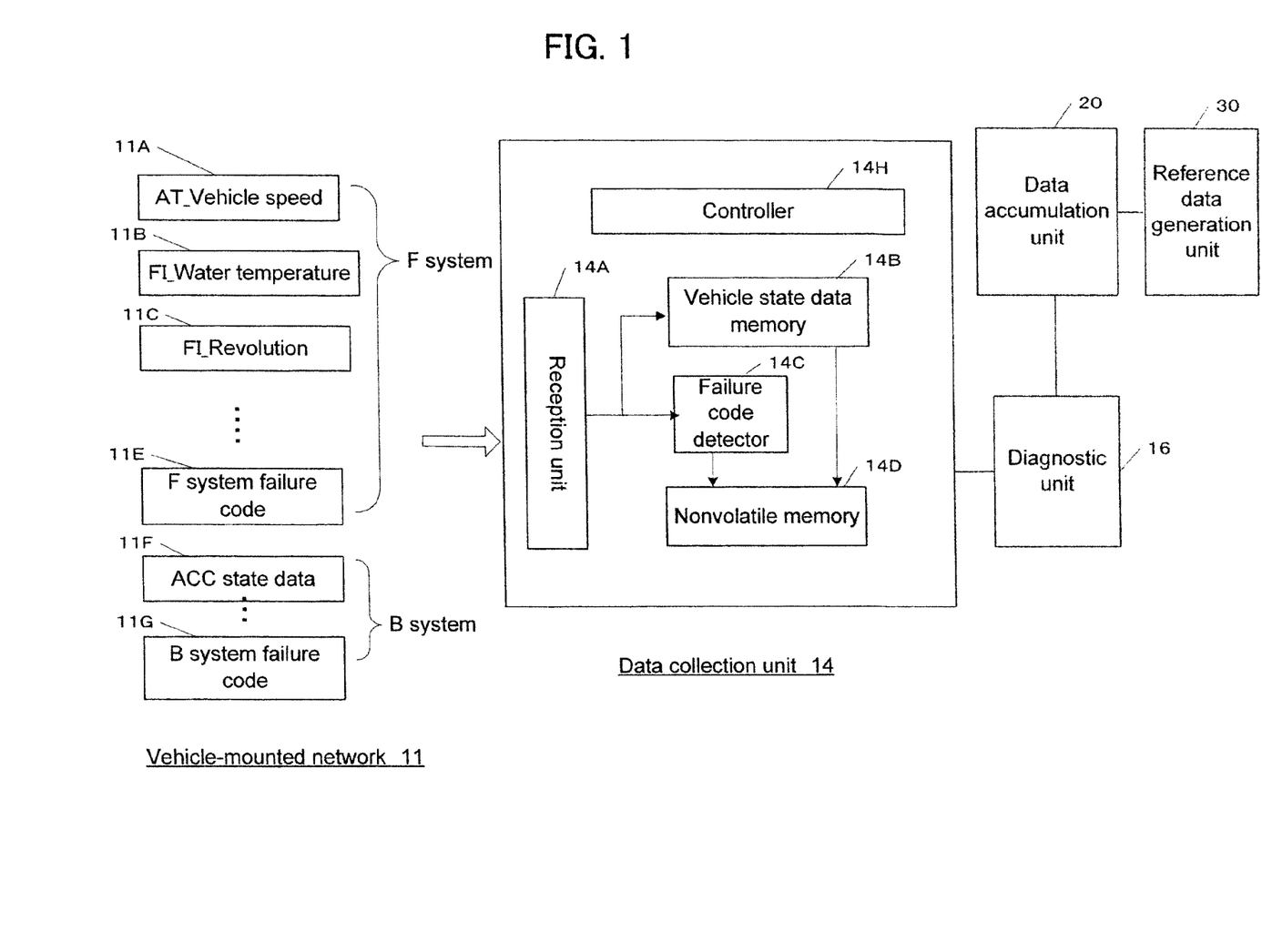
FIG. 1 is a diagram showing an entire structure of an apparatus according to one embodiment of the present invention.

An embodiment of the present invention will be described below with reference to the drawings. FIG. 1 shows a data collection unit 14 included in an electronic control system of a vehicle on which the present invention is based. A vehicle-mounted network 11 is a network for making communication between a plurality of electronic control units (ECU) mounted on the vehicle. In the embodiment, the network is divided into two systems such as F system and B system, but it may have only one system. The F system network is a network for making communication among a plurality of ECUs, which are so-called control systems, such as ECU for performing fuel ignition control and ignition timing control of an engine, ECU for controlling a transmission and ECU for performing brake control. The B system network is a network for making communication among a plurality of ECUs, which are so-called body's electric components system, such as ECU for controlling power windows or door locks, ECU for controlling lights, and ECU for controlling electric components such as air conditioner. The ECUs are basically computers, each of which is configured of a microprocessor and a communication module.

The F system network sends control system data such as vehicle speed data 11A, engine water temperature data 11B and engine revolution speed data 11C, and a failure code 11E indicative of a failure detected by the ECU to the data collection unit 14. The B system network sends data from a body's electric component ECU such as data 11F indicative of the state of an accessory (ACC) such as air conditioner, and a failure code 11G indicative of a failure detected by the ECU to the data collection unit 14.

The data collection unit 14 itself is a ECU. The data collection unit 14 is controlled by a controller 14H whose main element is a microprocessor. A receiving part 14A sequentially receives the latest data indicative of a state of the vehicle from the vehicle-mounted network 11, and the controller 14H sequentially and temporarily stores the data in a vehicle state data memory 14B. The vehicle state data memory 14B is a random access memory (RAM) and stores therein the latest data having a predetermined time interval of 20 seconds, for example, which is sequentially rewritten with new data every 0.2 second in first-in first-out (FIFO) shift register system.

A nonvolatile memory 14D is configured of a backup memory for maintaining the memory that a hold current is supplied by a battery also during power-off, or a rewritable ROM such as EEPROM. When receiving a failure code (DTC; Diagnosis Trouble Code), the controller 14H reads data for 15 seconds before the failure code occurs from the vehicle state data memory 14B and stores it in the nonvolatile memory 14D. The data is called onboard snap shot (OBS). The processing is executed each time a failure code occurs, and the nonvolatile memory 14D stores a plurality of OBSs corresponding to a plurality of failure codes.

When the vehicle is brought to a service shop for inspection and repair, a service staff connects a connection terminal of a failure diagnostic unit 16 to the output terminals of the ECUs to read the data stored in the nonvolatile memory 14D into the diagnostic unit and to extract reference normal value data corresponding to the inspection data, and compares the values of the respective driving parameters thereby to make a failure diagnosis utilizing the diagnostic unit.

Table 1 shows the exemplary OBSs stored in the nonvolatile memory 14D in response to a failure code occurrence. In this example, the driving parameters are denoted as R (engine revolution), V (vehicle speed) and T (temperature of engine cooling water). Actually, the data on a large number of (50 to 60 depending on a vehicle type, for example) parameters such as an output value of air/fuel ratio sensor, an output value of 02 sensor, a fuel injection time and an air/fuel ratio is contained in the OBSs, which are indicated as P4, P5, P6, . . . .

Time is indicated using a minus sign with a time 0.2 second before assuming that the occurrence time of the failure code is 0 second as reference.

TABLE 1

| Time (sec) | R (rpm) | V (km/h) | T (° C.) | P4 | P5 | P6 | ... |
|---|---|---|---|---|---|---|---|
| −14.8 | 1,461 | 32 | 78 | | | | |
| −14.6 | 1,437 | 37 | 78 | | | | |
| −14.4 | 1,383 | 36 | 78 | | | | |
| −14.2 | 1,353 | 33 | 79 | | | | |
| −14.0 | ... | ... | ... | | | | |
| −13.8 | ... | ... | ... | | | | |
| −13.6 | ... | ... | ... | | | | |
| ... | ... | ... | ... | | | | |
| ... | ... | ... | ... | | | | |
| ... | ... | ... | ... | | | | |
| ... | ... | ... | ... | | | | |
| −0.4 | ... | ... | ... | | | | |
| −0.2 | ... | ... | ... | | | | |
| 0.0 | ... | ... | ... | | | | |

The reference values as the normal value data will be described first by way of reference value examples based on their creation example.

In creating the reference values, a dedicated test vehicle provided with a driving data accumulation unit can be utilized to collect the normal value data under various driving situations, but a large number of travelling tests are required and a large amount of labor is required to collect and accumulate the data, and thus the reference values (normal values) of the data are extracted from the OBSs in the present embodiment.

How the reference values are created (extracted from the OBSs) will be described below. Even for the OBS data stored when a failure code occurs, the values of the parameters not relating to the failure are normal. Even the values of the parameters relating to the failure may be considered partially normal during 15 seconds before the occurrence of the failure. Thus, when the items of OBS data are collected for many failures and are subjected to a statistical processing, abnormal values are made inconspicuous among many normal values or are excluded, and consequently the parameter values during normal driving can be extracted.

For this purpose, it is better that the number of samples is more. In the embodiment, the number of sample vehicles is assumed as 13000 and the OBS data is obtained as described above from typical users' vehicles actually travelling in a city.

The normal value ranges to be extracted are considered existing per "certain state (certain driving condition)." Thus, if the items of OBS data in an approximate state are collected as a cluster (group) and appropriate value ranges are extracted for each cluster, the normal value ranges can be extracted in each "certain state."

Specifically, the clustering method is used to classify the items of approximate OBS data as a cluster (group). The appropriate value ranges of the parameters are extracted per cluster and are assumed as the reference values to be referred to during the failure diagnosis.

The clustering is a data analysis method for grouping data without external references and a method called K-means method is used in the embodiment. Specifically, the data is plotted into a space having a dimension corresponding to the number of parameters and the data is classified depending on its distance.

A reference data creation unit 30 collects the OBSs (one per vehicle) from 13000 vehicles, for example, for one vehicle type.

Then, the collected OBS data is clustered into "20" by the characteristic amounts of the three parameters such as "engine revolution: R", "vehicle speed: V" and "cooling water temperature: T" (primary clustering).

Further, the "20" clusters extracted by the primary clustering are further clustered into "30" by all the parameters to extract "600" clusters, that is, driving conditions (secondary clustering).

1. Primary Clustering

The primary clustering is roughly performed by the three parameters such as "engine revolution: R", "vehicle speed: V" and "cooling water temperature: T" on which the primary clustering particularly depends among the driving parameters relating to the occurrence of a failure, and the characteristic amounts of the three driving parameters are first extracted from the respective OBSs.

Figure 2:
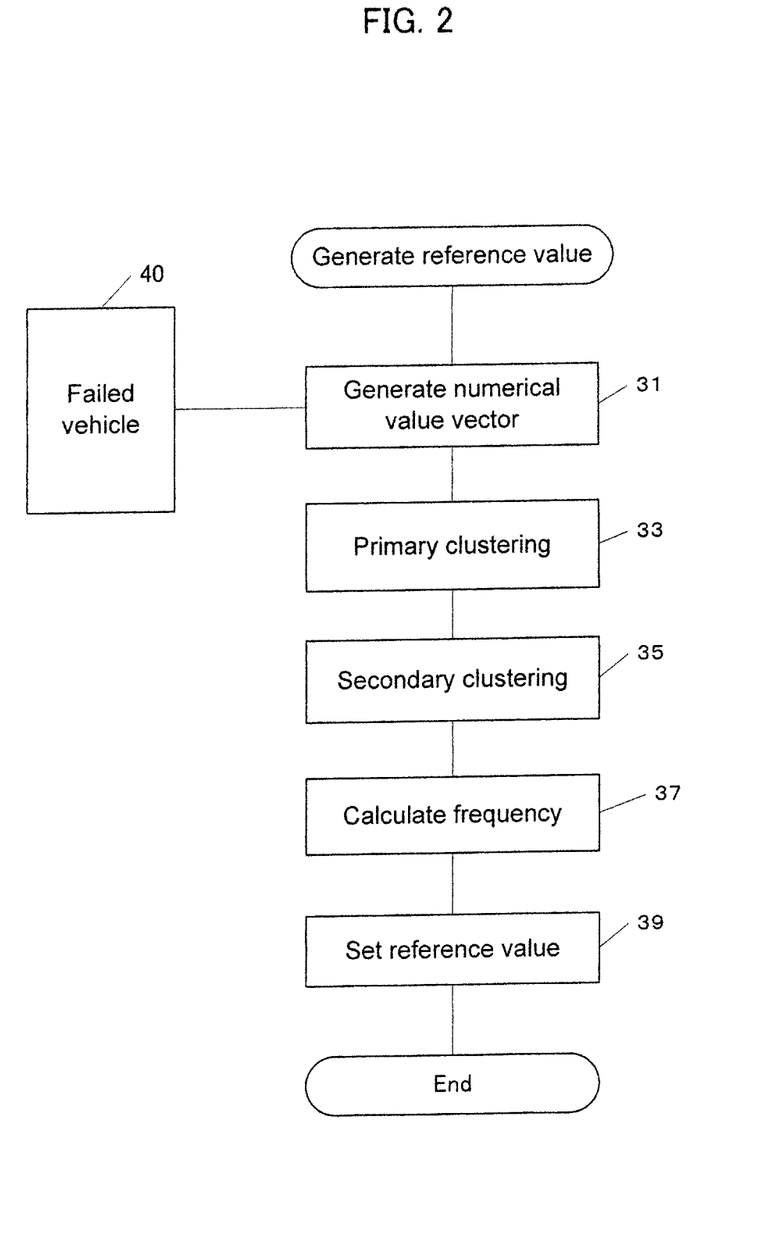
FIG. 2 is a diagram showing a process flow of reference value generation.

An example of reference value generation will be described with reference to FIG. 2 and FIG. 3. At first, the numerical vectors of the characteristic amounts of the driving parameters are generated (31). An average value of the parameters per three seconds, a maximum value, a minimum value, an average value of inclinations are used as the characteristic amounts in the example. The characteristic amounts may employ the numerical values suitable for the vehicle driving parameter analysis from among a standard deviation used in mathematical statistics, an amplitude value, the number of vibration, a minimum inclination, a maximum inclination, a degree of distortion, a kurtosis and the like. The parameters of the OBS data obtained from n (n is 1 to 13000) vehicles are indicated as $Rn$, $Vn$ and $Tn$, their average values are indicated as $Rn_{av}$, $Vn_{av}$ and $Tn_{av}$, their maximum values are indicated as $Rn_{mx}$, $Vn_{mx}$ and $Tn_{mx}$, their minimum values are indicated as $Rn_{mn}$, $Vn_{mn}$ and $Tn_{mn}$, and their inclination average values are indicated as $Rn_{in}$, $Vn_{in}$ and $Tn_{in}$.

The inclination described herein is the important characteristic amount which may be a judgment index indicative of how much the vehicle is accelerating, decelerating or cruise driving (constant speed driving), and is the value obtained by differentiating the amount of change in the parameter value f(x) relative to an elapsed time (h) to be expressed by the following formula. The inclination can be obtained by the operation of the differential of the parameter value f(x) in the digital operation.

$$\lim \frac{f(x+h) - f(x)}{h}$$

Figure 3:
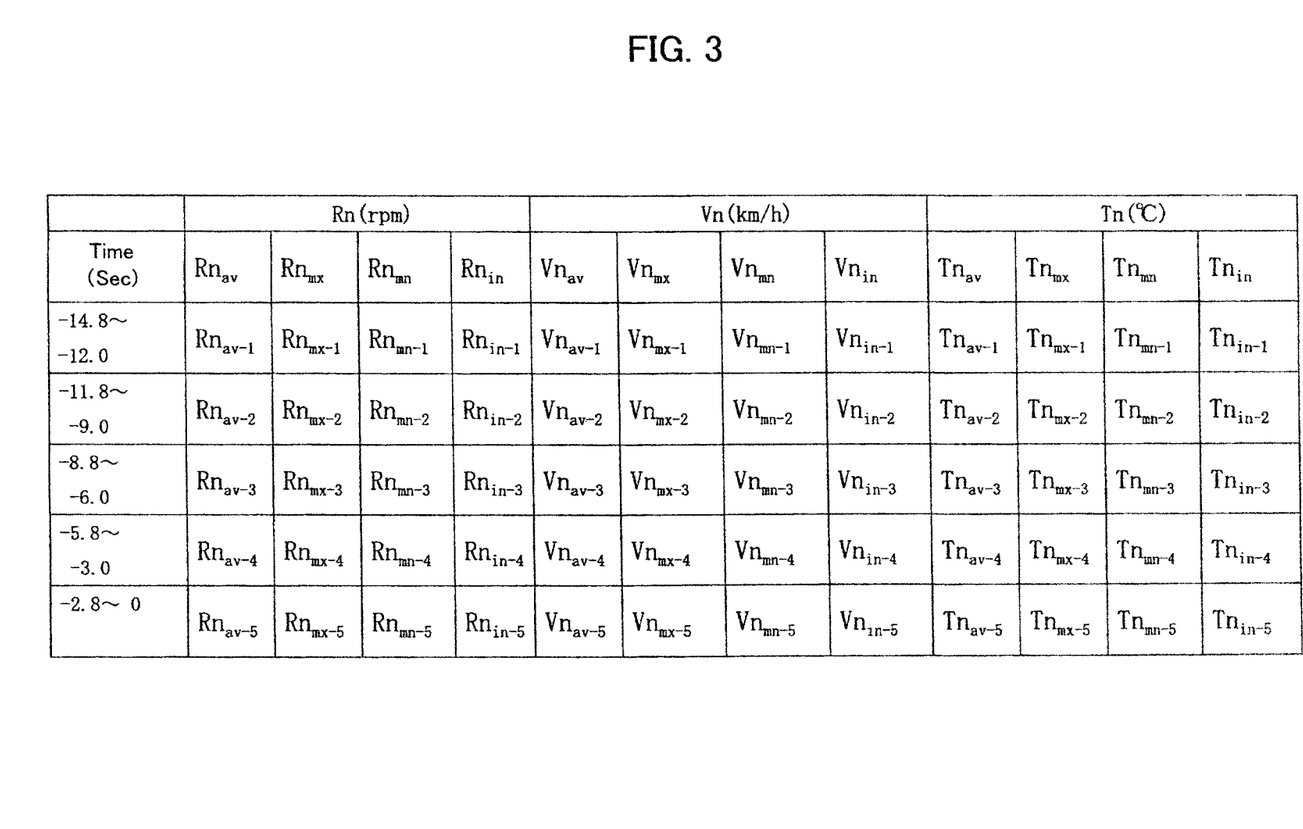
FIG. 3 is a diagram showing numerical vectors indicative of the characteristic amounts of driving parameters.

With reference to FIG. 3, the average value $Rn_{av-1}$, the maximum value $Rn_{mx-1}$, the minimum $Rn_{mn-1}$ and the inclination average value $Rn_{in-1}$ for the parameter Rk are generated for the first time zone (−14.8 to −12.0 seconds). Similarly, the average value $Vn_{av-1}$, the maximum value $Vn_{mx-1}$, the minimum value $Vn_{mn-1}$ and the inclination average value $Vn_{in-1}$ for the parameter V are generated, and $Tn_{av-1}$, $Tn_{mx-1}$, $Tn_{mn-1}$ and $Tn_{in-1}$ for the parameter T are generated. The characteristic amounts shown in table 2 are calculated for the second time zone (−11.8 to −9.0 seconds), the third time zone (−8.8 to −6.0 seconds), the fourth time zone (−5.8 to −3.0 seconds) and the fifth time zone (−2.8 to 0 seconds).

In the example, the respective numerical vectors in the five time zones for the three parameters (Rn, Vn, Tn) such as "engine revolution speed: R", "vehicle speed: V" and "cooling water temperature: T" are classified into, for example, 20 primary clusters Dj by the primary clustering (33). For the initial condition, a main core vector of the 20 primary clusters is randomly defined. The initial value of the core vector can be defined according to an empirical rule from a limited number of items of experimental data. When the main core vector of the j-th cluster is indicated as ($R_{av-cj}$, $R_{mx-cj}$, $R_{mn-cj}$, $R_{in-cj}$, $V_{av-cj}$, $V_{mx-cj}$, $V_{mn-cj}$, $V_{in-cj}$, $T_{av-cj}$, $T_{mx-cj}$, $T_{mn-cj}$, $T_{in-cj}$) assuming that j is an integer from 1 to 20, a Manhattan distance D1$nj$ between the numerical vector in the first time zone in the above table and the respective core vectors of the 20 clusters Dj is calculated in the following formula.

$$D1nj = |Rn_{av-1} - R_{av-cj}| + |Rn_{mx-1} - R_{mx-cj}| + |Rn_{mn-1} - R_{mn-cj}| + |Rn_{in-1} - R_{in-cj}| + |Vn_{av-1} - V_{av-cj}| + |Vn_{mx-1} - V_{mx-cj}| + |Vn_{mn-1} - V_{mn-cj}| + |Vn_{in-1} - V_{in-cj}| + |Tn_{av-1} - T_{av-cj}| + |Tn_{mx-1} - T_{mx-cj}| + |Tn_{mn-1} - T_{mn-cj}| + |Tn_{in-1} - T_{in-cj}| \quad (1)$$

The operation of the formula (1) with j=1, 2, 3, . . . , 20 is performed to find the Manhattan distance for one numerical vector (Rn, Vn, Tn) in the first time zone to cause the numerical vector (Rn, Vn, Tn) to belong to the cluster Dj of the core vector having the smallest value. The similar operation is performed on n=1, 2, 3, . . . , 13000 to cause the respective numerical vectors (Rn, Vn, Tn) to belong to the cluster Dj having the smallest Manhattan distance relative to the core vector. In this way, the numerical vector in the first time zone of the OBS data obtained from n vehicles are classified into 20 clusters Dj.

The Manhattan distance D2$nj$ between the numerical vector in the second time zone and the cluster D2$j$ in the second time zone in the above table is similarly calculated in the following formula also for the second time zone.

$$D2nj = |Rn_{av-2} - R_{av-cj}| + |Rn_{mx-2} - R_{mx-cj}| + |Rn_{mn-2} - R_{mn-cj}| + |Rn_{in-2} - R_{in-cj}| + |Vn_{av-2} - V_{av-cj}| + |Vn_{mx-2} - V_{mx-cj}| + |Vn_{mn-2} - V_{mn-cj}| + |Vn_{in-2} - V_{in-cj}| + |Tn_{av-2} - T_{av-cj}| + |Tn_{mx-2} - T_{mx-cj}| + |Tn_{mn-2} - T_{mn-cj}| + |Tn_{in-2} - T_{in-cj}| \quad (2)$$

The numerical vector in the second time zone of the OBS data obtained from n vehicles is classified into 20 primary clusters Dj based on the Manhattan distance. Similarly, the numerical vector in the third time zone is classified into 20 primary clusters Dj, and the numerical vector in the fourth time zone and the numerical vector in the fifth time zone are classified into 20 primary clusters Dj, respectively.

Then, an average value of the numerical vectors which belongs to each of the 20 primary clusters Dj is calculated and the average value is set as a core vector of each cluster. The thus-updated core vector is used to perform the above clustering again. When the core vector of each cluster is updated in the second clustering, the updated core vector is used to further perform the third clustering. The repetition is performed until the core vector converges or until a preset number of times of trials ends.

Since the way of the convergence is different depending on the core vector at the initial setting, for example, ten different initial settings are randomly prepared to repeat the clustering using a respective initial setting, and consequently the clustering result whose trial is converged the best can be employed. In this manner, the final core vectors (centers of gravity) can be obtained for the 20 primary clusters Dj, respectively.

Since the primary clustering is performed using the driving parameters having the highest importance to group the numerical value vectors having a high degree of approximation, all the data is first grouped roughly depending on a difference between the driving states having a high degree of importance. Thus, the respective groups, that is, clusters are formed in correspondence to the driving states having a relatively large difference.

2. Secondary Clustering

Then, the processing proceeds to the secondary clustering (35). In the secondary clustering, the OBS numerical value vectors (Table 1) of all the parameters contained in the clusters are further clustered for the 20 primary clusters Dj, and each primary cluster is classified into 30 secondary clusters. In other words, the 20 primary clusters corresponding to the mutually different driving states are subdivided into the 30 secondary clusters, respectively.

Since the respective primary clusters are subjected to the secondary clustering to form the 30 secondary clusters, 600 (20×30) secondary clusters in total are obtained. The respective OBS numerical vectors (65000 items of data in the example) belong to one of the 600 secondary clusters.

The initial values of the core vectors of the 30 secondary clusters used for the secondary clustering can be randomly defined similar to the primary clustering. The initial values can be defined according to an empirical rule in terms of the past data. The core vectors are updated by the same method as the primary clustering to find the final core vectors, and the 30 final core vectors are used to perform the final clustering, thereby forming the 600 secondary clusters.

3. Setting a Range of Normal Values

Figure 4:
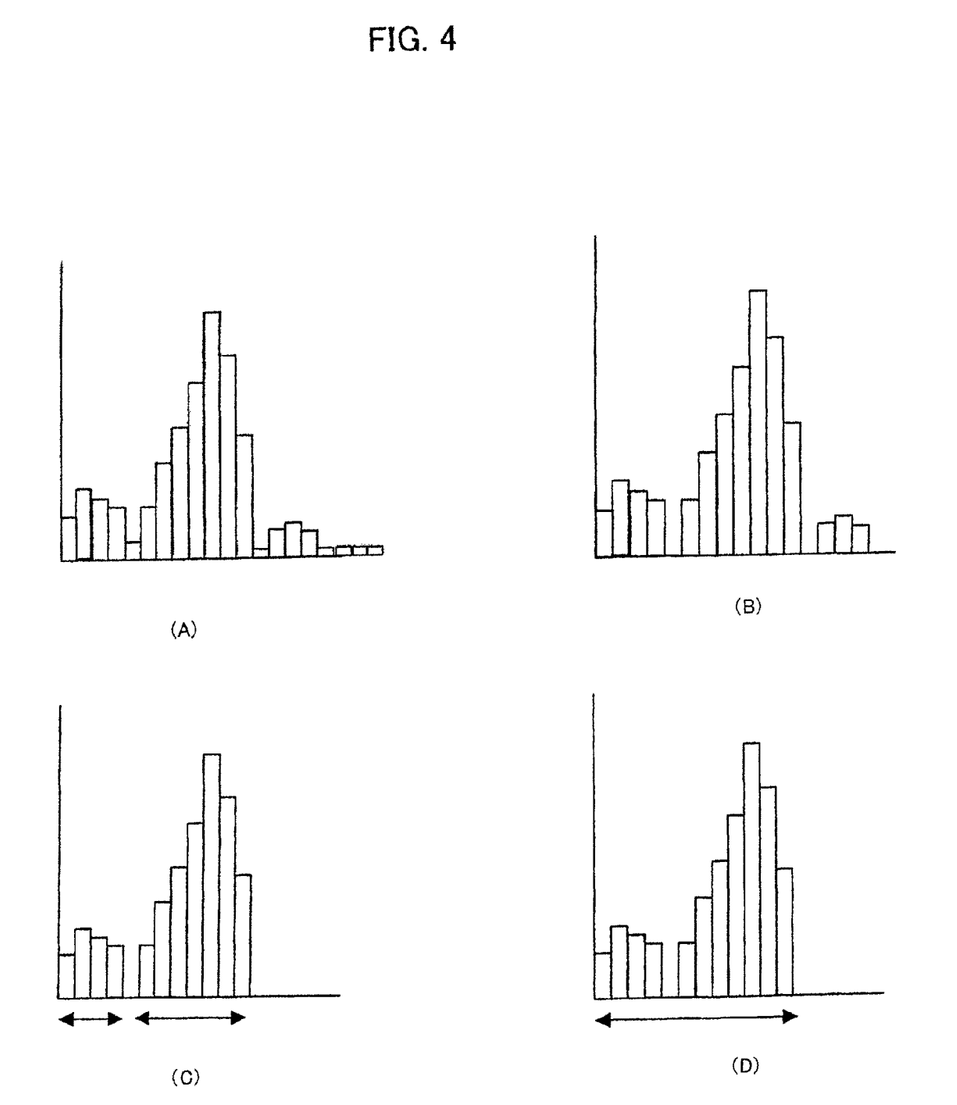
FIG. 4 is histograms showing occurrence rates of numerical values of the characteristic amounts.

Next, the processing proceeds to an occurrence rate calculating step 37, where a 20-divided histogram is created from the thus-obtained data of the 600 secondary clusters with the horizontal axis as the value of parameter and the vertical axis as the number of items of data per parameter (FIG. 4A). The class in which the value of the vertical axis is equal to or less than a predetermined value (a % of the total, for example) is excluded (FIG. 4B) and the remaining classes are grouped in units of adjacent classes such that the number of items of data which belongs to the group is b % or more (FIG. 4C). The processing is independently performed per cluster, that is, for the 600 secondary clusters.

At this time, the values of a % and b % are adjusted by the parameter residue of the clustering as a guide of the dispersion of the OBS data in the secondary cluster. The parameter residue is indicative of how long a respective parameter value of the numerical vector is away from the core vector as the center of gravity of the cluster to which the numerical value belongs. In the example, a difference between a respective numerical vector and the center of gravity of its belonging cluster is taken and the root-mean-square of the difference (square root of square sum) indicates the residue. Since a simple difference has a sign of plus or minus, the root-mean-square is used to know a magnitude of the difference.

For the parameter in which the parameter residue is larger and the dispersion is larger, a % and b % are reduced to widely extract a range of normal values (FIG. 4D).

The method described with reference to FIG. 4 will be specifically described with a simple example. A histogram per column (parameter) in FIG. 3 is created for all the numerical vectors in a certain cluster. For example, it is assumed that the histogram as shown in FIG. 2 is obtained for one of the characteristic amounts of certain driving parameters. If the cluster contains 100 numerical vectors, the total number of counts is 100.

TABLE 2

| Range of values in column | Number of counts |
|---|---|
| 0.0-0.1 | 22 |
| 0.1-0.2 | 0 |
| 0.2-0.3 | 0 |
| 0.3-0.4 | 18 |
| 0.4-0.5 | 30 |

TABLE 2-continued

| Range of values in column | Number of counts |
|---|---|
| 0.5-0.6 | 14 |
| 0.6-0.7 | 2 |
| 0.7-0.8 | 0 |
| 0.8-0.9 | 9 |
| 0.9-1.0 | 5 |

The count bars having a % or less of the total number of counts are deleted. Assuming that a % is 1%, the bars having the number of counts of 1 or less are deleted and the bars in table 3 remain. In the example of FIG. 4, the processing proceeds from the histogram of FIG. 4A to the histogram of FIG. 4B.

TABLE 3

| Range of values in column | Number of counts |
|---|---|
| 0.0-0.1 | 22 |
| 0.3-0.4 | 18 |
| 0.4-0.5 | 30 |
| 0.5-0.6 | 14 |
| 0.6-0.7 | 2 |
| 0.8-0.9 | 9 |
| 0.9-1.0 | 5 |

Adjacent bars are combined and grouped in the remaining bars. In this example, the bars are grouped as shown in table 4.

TABLE 4

| Group ID | Range of values in column | Number of counts |
|---|---|---|
| 1 | 0.0-0.1 | 22 |
| 2 | 0.3-0.7 | 64 |
| 3 | 0.8-1.0 | 14 |

The groups having the total number of counts of b % or less are deleted. For example, the groups having 20% or less are deleted, the group having the group ID of 3 is deleted and the groups in table 5 remain. In the example of FIG. 4, the processing proceeds from the histogram of FIG. 4B to the histogram of FIG. 4C.

TABLE 5

| Group ID | Range of values in column | Number of counts |
|---|---|---|
| 1 | 0.0-0.1 | 22 |
| 2 | 0.3-0.7 | 64 |

Next, the processing proceeds to reference value setting step 39 and the ranges of the columns in the remaining groups, that is, the driving parameters are assumed as normal value ranges. In this example, 0.0 to 0.1 and 0.3 to 0.7 are the normal value ranges. For simplicity of the data processing, the normal value ranges are collected into one reference value range to be used for the failure diagnosis. In this example, the reference value range is 0.0 to 0.7. In the example of FIG. 4, the processing proceeds from FIG. 4C to FIG. 4]).

As described above, in the present embodiment, the normal value ranges of the driving parameters can be generated under 600 different driving situations. In other words, the reference value ranges can be generated based on 600 driving environments for the driving parameters.

Next, there will be described the failure analysis using the reference value ranges based on the 600 driving environments created.

4. Failure Analysis

Figure 5:
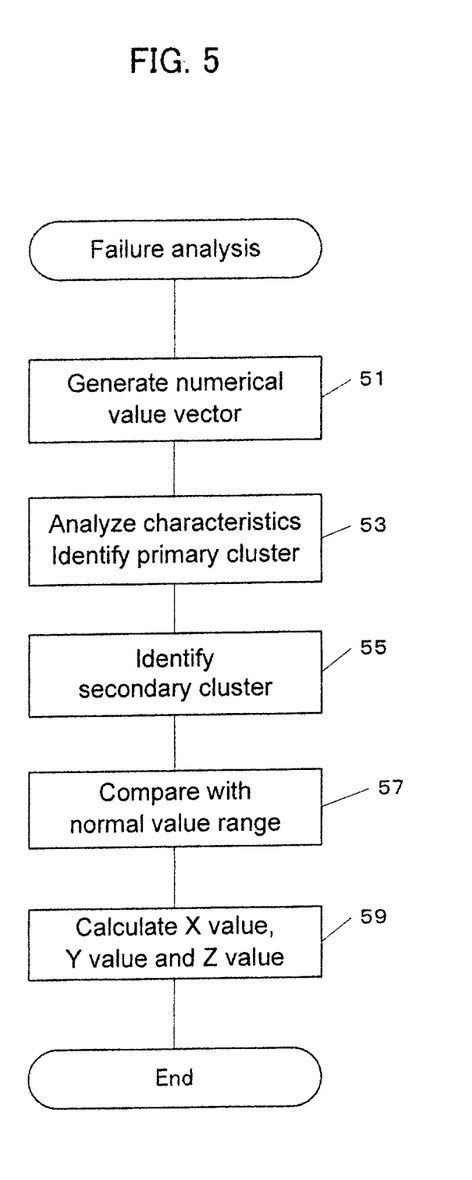
FIG. 5 is a functional block diagram showing a failure analysis process.

In order to analyze a vehicle failure utilizing the thus-obtained normal value data, the diagnostic unit 16 (FIG. 1) first reads the time-line ECU data from the vehicles to be diagnosed among the failed vehicles. The data is called inspection data. The exemplary inspection data is indicated in Table 6. An arrangement of numerical values in each row for the inspection data is called numerical value vector. Table 6 is similar to Table 1 and the parameters of the inspection data are denoted with R', V', T', P4', P5', P6', . . . . Since the numerical value vectors are recorded for 15 seconds at 0.2-second intervals, 75 (15/0.2=75) numerical value vectors are obtained from one vehicle. With reference to FIG. 5, the Table is created in block 52.

TABLE 6

| Tim (sec) | R' (rpm) | V' (km/h) | T (° C.) | P4' | P5' | P6' | ... |
|---|---|---|---|---|---|---|---|
| −14.8 | 1,461 | 32 | 78 | | | | |
| −14.6 | 1,437 | 37 | 78 | | | | |
| −14.4 | 1,383 | 36 | 78 | | | | |
| −14.2 | 1,353 | 33 | 79 | | | | |
| −14.0 | ... | ... | ... | | | | |
| −13.8 | ... | ... | ... | | | | |
| −13.6 | ... | ... | ... | | | | |
| ... | ... | ... | ... | | | | |
| ... | ... | ... | ... | | | | |
| ... | ... | ... | ... | | | | |
| ... | ... | ... | ... | | | | |
| −0.4 | ... | ... | ... | | | | |
| −0.2 | ... | ... | ... | | | | |
| 0.0 | ... | ... | ... | | | | |

4.1 Detection of Approximate Primary Clusters

Figure 6:
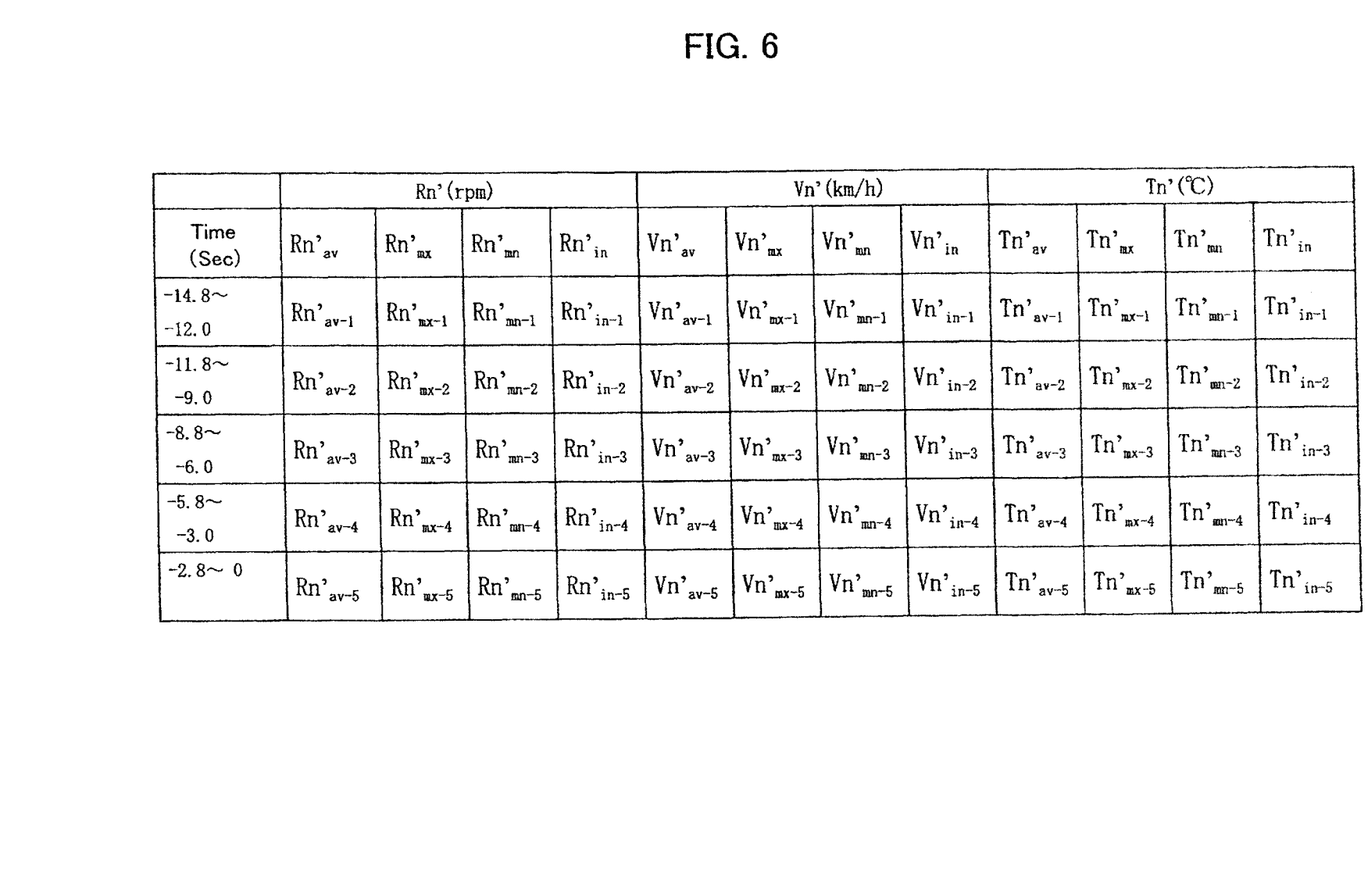
FIG. 6 is a diagram showing one example of a characteristic amount vector created from inspection data.

The processing proceeds to block 53 in FIG. 5, where the numerical value vectors are collected per three seconds for the three parameters such as the engine revolution R (rpm), the vehicle speed (km/h) and the engine cooling water temperature T (° C.) to calculate the average value, the maximum value, the minimum value and an inclination of the average value by the same method as the primary clustering stage in the process of setting the normal value ranges. Five characteristic amount numerical value vectors obtained in this way are indicated in FIG. 6. FIG. 6 is similar to FIG. 3, where the parameter for the inspection data is denoted with Rn', Vn', Tn', the average value is denoted with Rn'av, Vn'av, Th'av, the maximum value is denoted with Rn'mx, Vn'mx, Tn'mx, the minimum value is denoted with Rn'mn, Vn'mn, Tn'mn, and the inclination of the average value is indicated with Rn'in, Vn'in, Tn'in.

The above formula (1) is applied to the numerical value vectors of the characteristic amounts for inspection to calculate the Manhattan distances between the five numerical value vectors of the characteristic amounts in FIG. 6 and the core vectors of the 20 primary dusters obtained in the primary clustering stage, respectively. A core vector having the shortest Manhattan distance among the 20 core vectors is selected as the approximate primary cluster. The calculation is performed on the five numerical value vectors of the characteristic amounts and thus five approximate primary clusters are selected. The five approximate primary clusters may be overlapped on each other. Several approximate primary clusters may be obtained per characteristic amount numerical value vector and may then detect the secondary clusters.

4.2 Detection of Approximate Secondary Clusters

The processing then proceeds to block 55. The five (or more) approximate primary clusters selected as described above are subdivided into 30 secondary clusters, respectively.

It is assumed that the approximate primary cluster of the characteristic amount numerical value vector on the first row in FIG. 6 is Vk and similarly the approximate primary clusters of the characteristic amount numerical value vectors on the second, third, fourth and fifth rows are Vm, Vn, Vo and Vp, respectively. The primary cluster Vk is subdivided into 30 secondary clusters Vk1, Vk2, ..., Vk30. The primary clusters Vm, Vn, Vo and Vp are also subdivided in the similar manner.

The characteristic amount numerical value vector on the first row in FIG. 6 corresponds to three seconds for the inspection data in Table 6, that is, 15 rows. The distances between the inspection numerical value vectors for the first 15 rows in Table 6 and the core vectors of the 30 secondary clusters Vk1, Vk2, ..., Vk30 are calculated in the same way as the secondary clustering stage, respectively. A secondary cluster and core vector having the shortest distance is selected for a respective inspection numerical value vector based on the calculation.

The similar calculation is performed also for the characteristic amount numerical value vectors on the second to fifth rows in FIG. 6 and the secondary duster and core vectors having the shortest distance are selected therefor, respectively. In this way, 75 secondary clusters are obtained corresponding to 75 inspection numerical value vectors. For the secondary clusters, the normal value ranges for the respective driving parameters are set (block 39 in FIG. 2).

4.3 Parameter Normality Judgment

Next, the processing proceeds to block 57. The 75 inspection numerical value vectors (Table 6) and the normal value ranges of the 75 secondary clusters obtained as described above are compared according to their correspondence relationship and a driving parameter whose data value is out of the normal value range is assumed as a candidate key for failure search.

The processing proceeds to block 59, where a possibility of deviation from the normal value (X value), a magnitude of deviation from the normal value range (Y value) and a degree of consecutive deviation (Z value) are calculated for the driving parameter as the candidate key for failure search obtained in the above manner. The next Table indicates comparative examples between the numerical values (data values) of the 75 numerical value vectors for the driving parameter as the candidate key for failure search and the normal value ranges of the driving parameters in the corresponding secondary clusters. The judgment as abnormal is written in the rows of the numerical value vectors whose data values are out of the normal value ranges and the judgment as normal is written into the rows of the numerical value vectors within the normal value ranges.

TABLE 7

| Row number | Normal value range | Data value | Judgment |
| --- | --- | --- | --- |
| 1 | 0-3 | 4 | Abnormal |
| 2 | 0-3 | 2 | Normal |
| 3 | 2-5 | 3 | Normal |
| 4 | 2-8 | 5 | Normal |
| ... | | | Normal |
| 25 | 4-9 | 15 | Abnormal |
| 26 | 4-9 | 8 | Normal |
| ... | | | Normal |
| 73 | 2-5 | 7 | Abnormal |
| 74 | 0-3 | 4 | Abnormal |
| 75 | 0-3 | 4 | Abnormal |

The possibility of deviation from the normal value (X value) is a rate of the number of rows out of the normal values relative to the total number of rows, and can be expressed in the following formula.

$$X = \text{Number of rows out of normal values/Total number of rows}$$

In the example of Table 7, $X = 5/75.67$ is obtained.

The magnitude of deviation from the normal value (Y value) is a value obtained by dividing and normalizing the distance between a data value on one row out of the normal value and the end of the normal value range by the width between the maximum value and the minimum value which the driving parameter may take, that is, a difference therebetween, and can be expressed by the following formula.

$$Y = \text{(Data value most out of normal value−Value of end of normal value range)/(Parameter's possible maximum value−Minimum value)}$$

In the example of Table 7, the numerical value vector (row) having the largest deviation from the normal value is the 25th row and its data value is 15 and its normal value range is between 4 and 9. When the minimum value and the maximum value, which the parameter may take, are 0 and 20, respectively, the magnitude Y of deviation is as follows.

$$Y = (15−9)/(20−0) = 0.3$$

The normalization will be described herein. The driving parameters includes various kinds such as temperature, voltage and angle, and their data values are different in unit depending on the kind of parameter and their possible value ranges are largely different. For example, the engine revolution takes the unit of rpm and a value between 0 and 5000, and a voltage of various sensors takes the unit of volt and a value between 0 and 5. When the Y value of the parameter is used for comparison, the widths of the parameters need to be unified in the same scale. Therefore, there is performed a processing of assuming the width between the maximum value and the minimum value as 1 for each parameter. This is the normalization.

The degree of consecutive deviation (Z value) is a rate of the maximum number of numerical value vectors (the number of rows) out of the normal values continuously in a time-line manner relative to the total number of rows, and is expressed in the following formula.

$$Z = \text{Maximum value of the number of rows continuously deviated from normal values/Total number of rows}$$

In the example of Table 7, the three rows of the 73th, the 74th and the 75th rows are consecutively judged to be abnormal and other rows are not more consecutively judged to be abnormal. In this case, the maximum number of rows for the deviation is 3. Thus, the degree Z of consecutive deviation is as follows.

$$Z = 3/75 = 0.04$$

The symptoms of the vehicle failures are various and are roughly divided into the following three symptoms.

1) A failure such as disconnection or short-circuit of sensor in which a symptom suddenly occurs at a certain point of time and continues.

2) A failure such as mixing of impurities into fuel in which a slight symptom continues for a long time.

3) A failure such as failed contact in which an instantaneous symptom occurs irregularly.

In the symptom (1), the Y value (the magnitude of deviation) and the Z value (the degree of consecutive deviation) are large. In the symptom (2), the X value (the possibility of deviation) and the Z value (the degree of consecutive deviation) are large. In the symptom (3), the X value (the possibility of deviation) and the Y value (the magnitude of deviation) are large. The X value and the Z value indicate the frequency and consecutiveness of the presence of deviation and the Y value indicates the magnitude of deviation.

Thus, the parameters characteristic of the symptom are present per failure symptom and a combination of X value, Y value and Z value is present therefor. One or multiple parameters as keys for searching a failure cause, which are obtained through the above analysis, and the X value, the Y value and the Z value for the parameters are presented on a display device of the diagnostic unit 16 or as a document printed by a printer to an engineer for vehicle maintenance. The engineer can estimate a failure cause of the vehicle from information and can maintain the vehicle.

Figure 7:
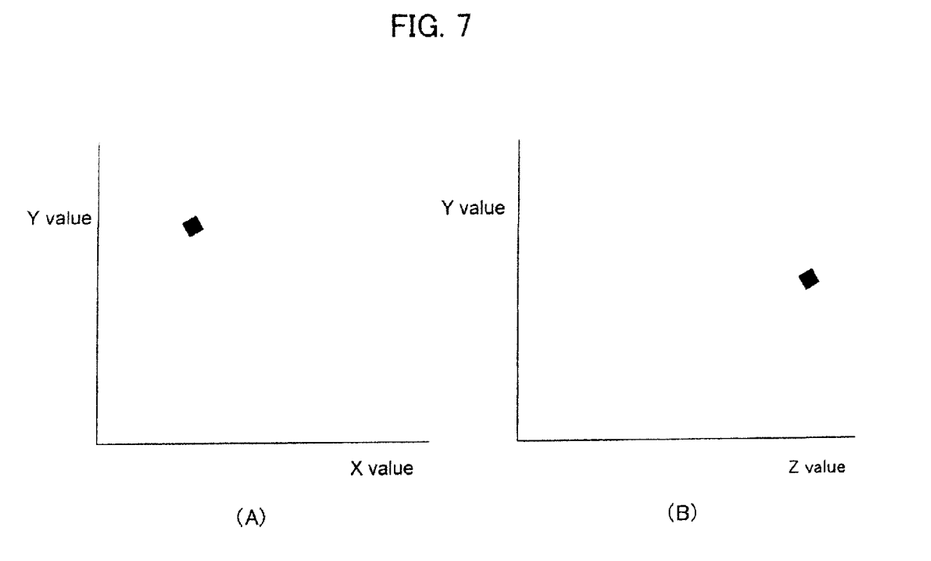
FIG. 7 shows distribution diagrams of X value, Y value and Z value obtained in the failure analysis.

The diagnostic unit 16 prepares a distribution diagram by the X value and the Y value and a distribution diagram by the Y value and the Z value based on representative failure cases, and presents the same to the engineer to assist a work of searching a failure portion. FIG. 7A shows one example of the distribution diagram by the X value and the Y value, where the Y value is larger than the X value for a disconnection failure of an intake temperature sensor. The driving parameter herein uses a voltage of the IAT (Intake Air Temperature) sensor. FIG. 7B shows one example of the distribution diagram by the Y value and the Z value, where the Z value is larger than the Y value for the parameter as the feedback voltage of the O2 sensor in a failure such as mixing of impurities into a fuel.

The diagnostic unit 16 can apply the association analysis to the above analysis result and can assist the search of the failure cause. When the X value (the possibility of deviation), the Y value (the magnitude of deviation) and the Z value (the degree of consecutive deviation) are obtained for the two parameters A and B deeply relating to the failure cause, if the X value, the Y value and the Z value are the same between the two parameters A and B, the parameter the Y value of which is larger is at a higher rank but may be different from the actual failure cause.

For example, an aperture of the accelerator and the fuel injection amount of the injector are in a proportional relationship and strongly correlate each other. When there occurs a failure that "if the accelerator is stepped, the injector can inject half the normal amount of fuel", if the aperture of the accelerator is correct, the injector fails, and if the injection amount of the injector is correct, the accelerator aperture sensor can output only half the aperture voltage.

Since the clustering is performed on the group in which either one of the aperture and the injection amount is correct, in some cases, the aperture of the accelerator may be considered as the failure parameter even when the injector is the failure cause.

In order to address such a case, the parameters having a strong correlation with the important parameter estimated from the X value, the Y value and the Z value are presented together, thereby preventing an erroneous judgment due to only one parameter.

The association analysis is a method for numerically measuring a strength of the correlation between the parameters among the driving parameters, in which a parameter most correlated with another parameter can be known with a coefficient of "reliability."

The association analysis uses the "amount of loads" as a parameter derived from the main component analysis. The amount of loads is a value defined for each original parameter and is indicative of how much each parameter is correlated with the main components obtained in the main component analysis. The amount of loads is determined relative to the relationship between a respective main component and each parameter, and is a so-called correlation coefficient between the main component values of the ECU data (Table 1) and the driving parameters. The larger the absolute value of the amount of loads is, the stronger the relationship between the main components and the driving parameters is.

The following information can be obtained by the association analysis.

| Premise | Conclusion | Reliability | Support |
|---------|------------|-------------|---------|
| A | B | 90 | 5 |

The description reads that "a rule that if A is contained in a combination of parameters (premise), B is also contained therein (conclusion) has a reliability of 90% and a support of 5%." The reliability indicates a rate at which the conclusion is obtained under the condition under which the premise is met. The support is a rate of the total at which the premise and the conclusion are contained in a combination of parameters.

In the example, B is also contained in the combination of parameters containing A at the rate of 90% and the combination of parameters containing A and B is 5% of the total. The parameters contained in the premise and the conclusion are considered in a strong relationship. Thus, the association analysis is applied to the present invention thereby to improve the accuracy of the failure analysis.

The present invention has been described above by way of the specific embodiment. The present invention is not limited to the embodiment.

The invention claimed is:

1. A method for making a failure diagnosis by comparing driving data relating to a plurality of parameters stored in an electronic control unit of a vehicle when a failure occurs in the vehicle with reference values as reference driving data during normal time, the method comprising:

selecting, via a failure diagnostic unit, reference value groups categorized by driving environment, which are entirely approximated to inspection data, by approximate search between the inspection data which is the driving data stored in the electronic control unit of the vehicle to be subjected to failure diagnosis and the reference value groups categorized by the driving environment whose normal value ranges are set for the plurality of parameters categorized by the driving environment; and identifying one of the plurality of parameters having a substantially large deviation from the normal value range by comparing the inspection data with the normal value ranges for the plurality of parameters in the selected reference value groups categorized by the driving environment, the failure diagnostic unit searching a failure cause based on the identified one of the plurality of parameters.

2. The method according to claim 1, wherein the driving data for the plurality of parameters obtained from many vehicles are clustered by a clustering method to set the normal value ranges of the driving data for the plurality of parameters into respective clusters so that the reference value groups categorized by the driving environment are formed.

3. The method according to claim 2 wherein the inspection data is numerical value vectors having predetermined time intervals of the plurality of parameters and selecting approximate reference value groups categorized by the driving environment calculates a distance between the numerical value vector and a core vector as a center of gravity of a cluster of the reference value group to select the reference value group having a shortest distance per the numerical value vector.

4. The method according to claim 3, wherein the clusters include primary clusters for which partial parameters among the plurality of parameters are clustered and secondary clusters for which the numerical value vectors belonging to the primary clusters are clustered for more parameters than the partial parameters, and the selecting the approximate reference value groups categorized by the driving environment selects the primary clusters for the numerical value vectors of the inspection data and then selects a cluster having the shortest distance from the secondary clusters belonging to the primary clusters.

5. The method according to claim 2, wherein a deviation from the normal value range is judged by comparing the normal value ranges of the clusters selected corresponding to the numerical value vectors of the inspection data with the numerical value vectors and using at least a ratio of the number of numerical value vectors out of the normal value ranges relative to the number of numerical value vectors of the inspection data.

6. The method according to claim 2, wherein a deviation from the normal value range is judged by comparing the normal value ranges of the clusters selected corresponding to the numerical value vectors of the inspection data with the numerical value vectors and using, for a parameter, at least a difference between the numerical values of the numerical value vectors of the inspection data out of the normal value ranges and the normal value ranges.

7. The method according to claim 2, wherein a deviation from the normal value range is judged by comparing the normal value ranges of the clusters selected corresponding to the numerical value vectors of the inspection data with the numerical value vectors and using at least a ratio of the number of numerical value vectors continuously out of the normal value ranges relative to the total number of numerical value vectors.

* * * * *